(12) United States Patent
Schreiber et al.

(10) Patent No.: US 7,583,830 B2
(45) Date of Patent: Sep. 1, 2009

(54) METHOD FOR CORRECTING IMAGE ARTIFACTS DUE TO DETECTOR OVEREXPOSURE IN COMPUTED TOMOGRAPHY

(75) Inventors: Bernd Schreiber, Heroldsbach (DE); Thomas Brunner, Nürnberg (DE)

(73) Assignee: Siemens Aktiengesellschaft, Munich (DE)

( * ) Notice: Subject to any disclaimer, the term of this patent is extended or adjusted under 35 U.S.C. 154(b) by 603 days.

(21) Appl. No.: 11/301,927

(22) Filed: Dec. 13, 2005

(65) Prior Publication Data

US 2007/0133748 A1    Jun. 14, 2007

(51) Int. Cl.
| | |
|---|---|
| G06K 9/00 | (2006.01) |
| A61B 6/00 | (2006.01) |
| G01N 23/00 | (2006.01) |
| G21K 1/12 | (2006.01) |
| H05G 1/60 | (2006.01) |
| H01J 37/20 | (2006.01) |

(52) U.S. Cl. ............ 382/131; 382/132; 250/455; 378/21; 378/27

(58) Field of Classification Search ......... 382/131–132, 382/167, 274; 250/455, 205; 345/20, 63, 345/77, 581–618, 569–599, 690–697; 348/251, 348/254; 358/518–523, 461; 378/21–33
See application file for complete search history.

(56) References Cited

U.S. PATENT DOCUMENTS 5,165,100 A * 11/1992 Hsieh et al. ............ 382/131

* cited by examiner

*Primary Examiner*—Brian P Werner
*Assistant Examiner*—Randolph Chu
(74) *Attorney, Agent, or Firm*—Schiff Hardin LLP

(57) ABSTRACT

In a method for reconstructing a 3D CT image from a number of 2D projection images each 2D projection image is divided at an arbitrarily selectable position by a substantially vertical image line and the projection image is automatically electronically analyzed to detect whether clipping occurs on the left side or on the right side, or on both sides, of the image line. For each side of the image line at which clipping is detected, a horizontal coordinate at which the clipping ends is identified. The grayscale values at the side of the horizontal coordinate opposite to the side at which the image line is located are extrapolated so that the clipping is removed. The corrected 2D projection images are then used to reconstruct a 3D image, in which capping artifacts, that would otherwise be present, or avoided or substantially minimized due to the corrections made in the 2D projections.

4 Claims, 5 Drawing Sheets

METHOD FOR CORRECTING IMAGE ARTIFACTS DUE TO DETECTOR OVEREXPOSURE IN COMPUTED TOMOGRAPHY

BACKGROUND OF THE INVENTION

1. Field of the Invention

The present invention is directed to a method used in the reconstruction of an image from computed tomography data to correct artifacts in the image arising due to overexposure of the radiation detector of the computed tomography apparatus.

2. Description of the Prior Art

The use of flat panel digital detectors for detecting x-ray radiation in computed tomography is becoming increasingly common. Typical flat panel digital detectors that are suitable for this type of use have a dynamic range of 14 bits. Digital image pixel processors that are conventionally used to process the raw image data reduce the dynamic range to only 12 bits, which is relatively small compared to the dynamic range of conventional computed tomography radiation detector, which typically is between 18 and 20 bits.

A dynamic range of 12 bits often is not large enough to avoid overexposure in the 2D projection images, namely the reconstructed density values (Hounsfield values) are too small. This negative impact is especially seen in 3D imaging. In addition, so-called "capping artifacts" arise. Capping artifacts occur because, even for a homogenous object, the reconstructed Hounsfield values are not reduced by a simple DC offset, but become increasingly smaller toward the edges of the object. This is schematically shown in FIG. 1 for a homogenous cylinder. Capping artifacts are very disturbing for detecting low contrast objects in the reconstructed images.

SUMMARY OF THE INVENTION

It is an object of the present invention to provide a simple and efficient correction method that is able to decrease capping artifacts in computed tomography images, that arise due to detector overexposure, thereby resulting in better low contrast resolution in the image and a substantial improvement in the quality of the reconstructed image.

The above object is achieved in accordance with the invention in a method for reconstructing a 3D CT image wherein each 2D projection image, which will enter into the reconstruction of a 3D image, is divided at an arbitrarily selectable position by a substantially vertical image line, and the projection image is automatically electronically analyzed to detect whether clipping occurs on the left side or on the right side, or on both sides, of the image line. For each side of the image line at which clipping is detected, the x-coordinate where the clipping ends is identified, and the data (grayscale values) at the side of the aforementioned x-coordinate opposite to the side at which the image line is located are automatically electronically extrapolated so that the clipping is removed. The corrected 2D projections are then used to reconstruct a 3D image, in which capping artifacts that would otherwise be present, are avoided or substantially minimized due to the corrections made in the 2D projections.

If analysis of the image shows that clipping due to overexposure exists in a central part of the image line, as can occur when imaging the lung, a smooth extrapolation of the grayscale values is undertaken for this center region.

DESCRIPTION OF THE PREFERRED EMBODIMENTS

Figure 1:
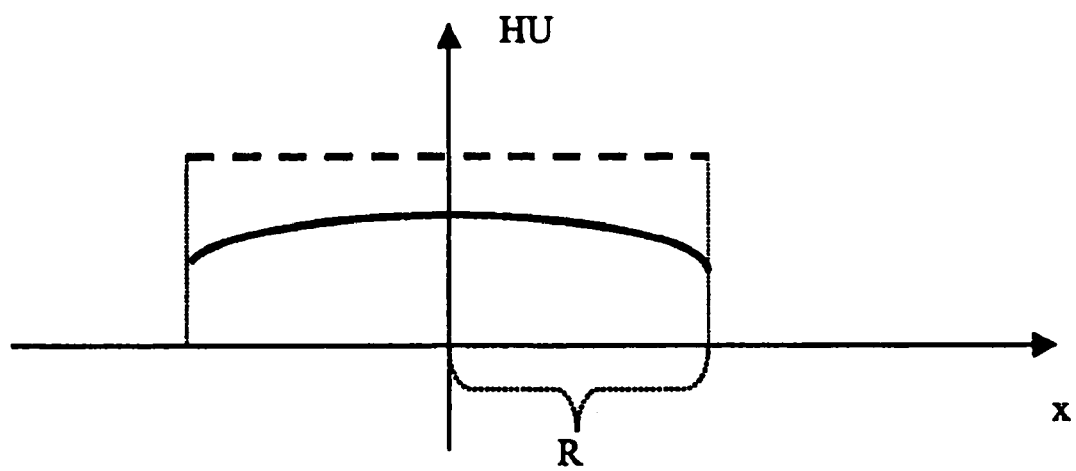
FIG. 1 illustrates Hounsfield values for a homogenous cylinder and schematically indicates a clipping artifact.

The phenomenon of clipping, as discussed above is schematically illustrated in FIG. 1, which shows Hounsfield values for a homogenous cylinder with a radius R along the direction of the x-axis, with Hounsfield values HU along the vertical axis. Due to the above-discussed overexposure, the resulting Hounsfield values of the image reconstruction are smaller at the edges, thereby causing a line under consideration (solid curved line) to exhibit a capping artifact, compared to the dashed line of the image, wherein no capping artifact exists.

The following provides general background information for use in explaining the inventive method and its application in the field of angiographic computed tomography imaging.

Figure 2:
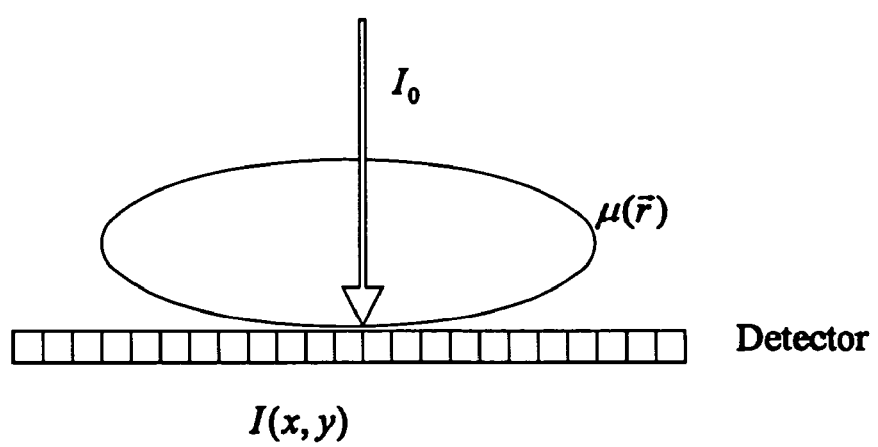
FIG. 2 illustrates density values and intensities for use in explaining the inventive method.

The input for the image reconstruction algorithms must be line integrals $\int \mu(\bar{r})ds$ of the object of interest. Line integrals are defined as follows:

$$\int \mu(\bar{r})ds = \ln\left(\frac{I_0}{I(x,y)}\right)$$

wherein $I_0$ is the maximum intensity when no object is present $I(x,y)$ is the measured intensity after a ray has passed through the object, as schematically illustrated in FIG. 2.

The measured grayscale value $g(x,y,)$ in the 2D projection images and the maximum grayscale value $g_0(\lambda)$ are functions of $I(x,y)$ and $I_0$, i.e., $$g(x,y) = f(I(x,y))$$

$$g_0(\lambda) = f(I_0)$$

Because the computed tomography system continually readjusts the tube voltage, the tube current and the pulse width, the maximum $g_0(\lambda)$ will be different for each projection λ. The maximum $g_0(\lambda)$ often is larger than maximum value often is larger than the maximum value 4,095 that can be represented using a 12 bit imaging system. Therefore, the 2D projection datasets are clipped at the edges, leading the capping artifact in the reconstructed 3D datasets discussed above.

These artifacts are substantially decreased, or avoided, in a method according to the invention wherein, for every projection λ, the maximum grayscale value $g_0(\lambda)$, is determined as a function of the tube voltage, tube current and pulse width.

Figure 3:
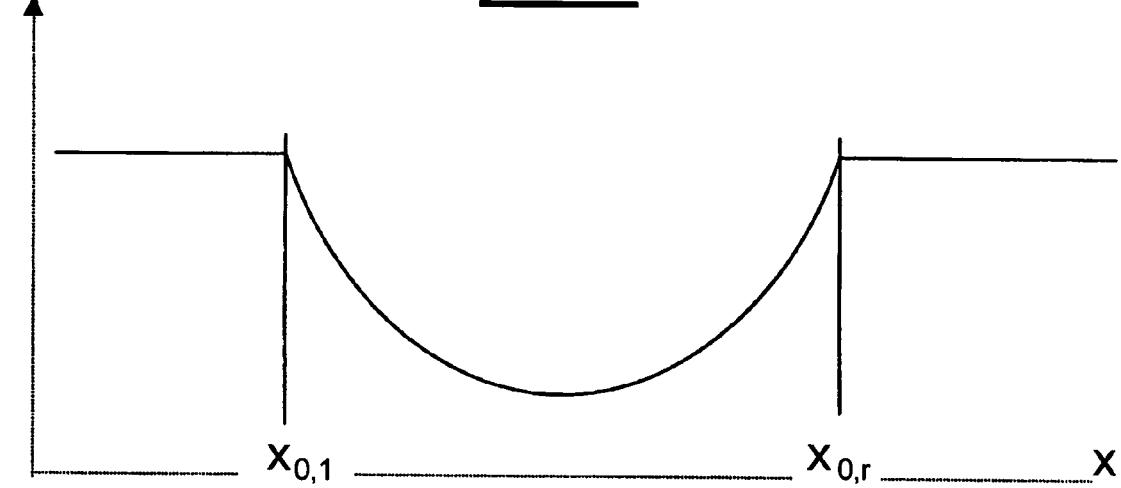
FIG. 3 is a profile of the image g(x,y,λ) along line j, wherein clipping due to overexposure can be seen.

The image $g(x, y, \lambda)$ is then analyzed as follows. A vertical or substantially vertical image line is arbitrarily selected, and if the image exhibits clipping on the left side of this image line, the x-coordinate $x_{0,l}$ is determined where the clipping ends, as indicated in FIG. 3. To the left side of $x_{0,l}$, the image data $g(x,y,\lambda)$ are extrapolated as follows:

$$g(x,y,\lambda)=g_0(\lambda)-e^{-(x-x_{0,l})^2/\zeta_l^2}\cdot[A_l\cdot(x-x_{0,l})+B_l].$$

The parameters $A_1$ and $B_1$ are determined by requiring that both $g(x,y,\lambda)$ and its first derivative in the x-direction be continuous, i.e.:

$$B_1=g_0(\lambda)-g(x_{0,1},y,\lambda),$$

$$A_1=-g'(x_{0,1},y,\lambda).$$

Figure 4:
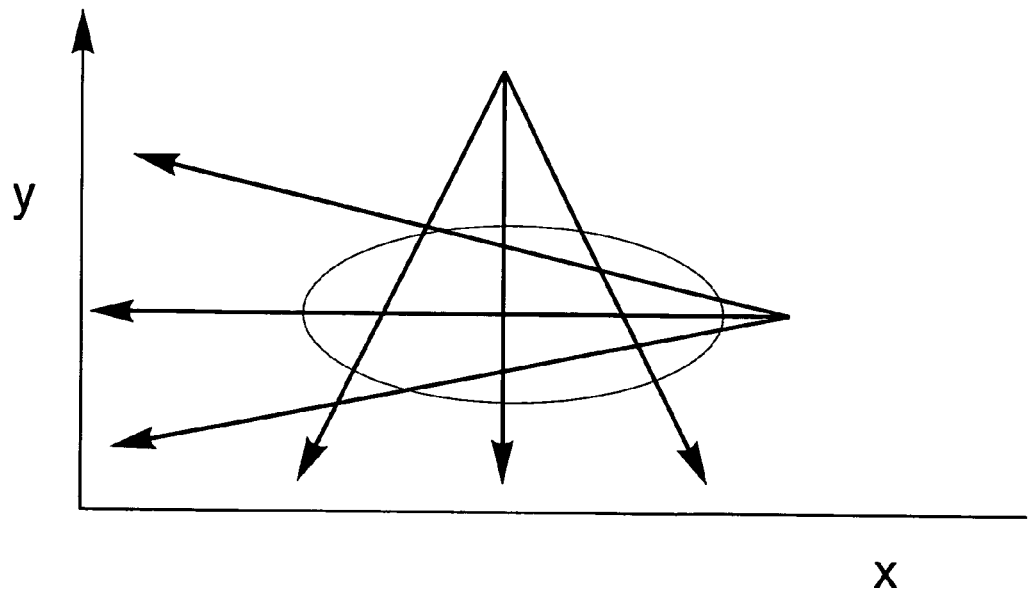
FIG. 4 illustrates the use of an orthogonal projection for estimating the parameter ζ in the inventive method.

The parameter $\zeta_1$ is related to the size of the object and indicates how rapidly the maximum intensity $g_0(\lambda)$ is asymptotically reached. If a water-like ellipsoid is assumed, $\zeta_1$ can be estimated by using an orthogonal projection, because the central ray of this orthogonal projection contains the line integral along the desired direction, as schematically shown in FIG. 4.

If the analysis of the image $g(x,y,\lambda)$ indicates clipping on the right side of the image line, the x-coordinate $x_{0,r}$ is determined where the clipping ends, as also shown in FIG. 3.

To the right side of $x_{0,r}$, the image $g(x,y,\lambda)$ are extrapolated as follows:

$$g(x, y, \lambda)=g_0(\lambda)-e^{-(x-x_{0,r})^2/\zeta_r^2}\cdot[A_r\cdot(x-x_{0,r})+B_r].$$

The parameters $A_r$ and $B_r$ are determined analogously to those described above:

$$B_r=g_0(\lambda)-g(x_{0,r},y,\lambda),$$

$$A_r=-g'(x_{0,r},y,\lambda).$$

and $\zeta_r$ again is estimated using orthogonal projections.

If clipping due to overexposure exists in the central part of the image line as occurs, for example, when imaging the lung, a smooth extrapolation of grayscale values is undertaken for this center region, recognizing that the first derivative must be continuous because of the Shepp-Logan filter.

The inventive method has been implemented and tested with simulated and measured data.

Figure 5:
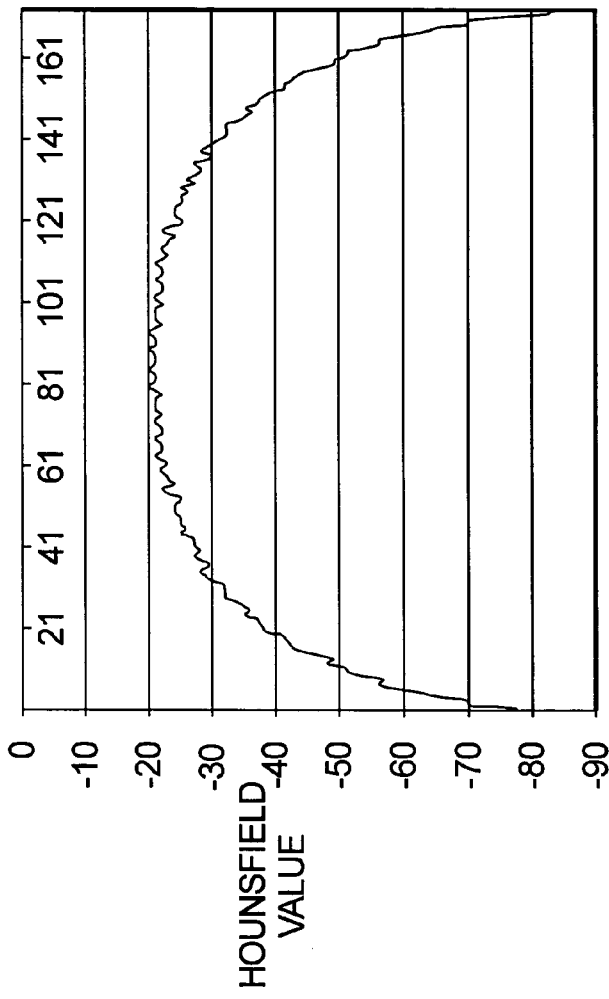
FIG. 5 shows the reconstructed slice of a water-like homogenous cylinder wherein projection areas that are clipped due to overexposure are not corrected, together with the profile of the image line under consideration, exhibiting clipping artifacts.
Figure 5:
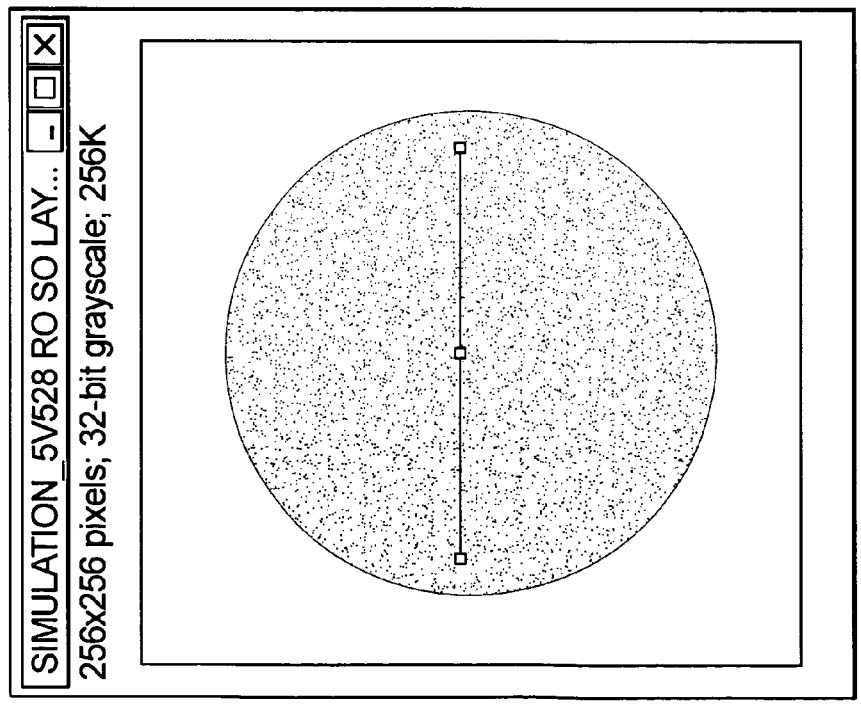
Figure 6:
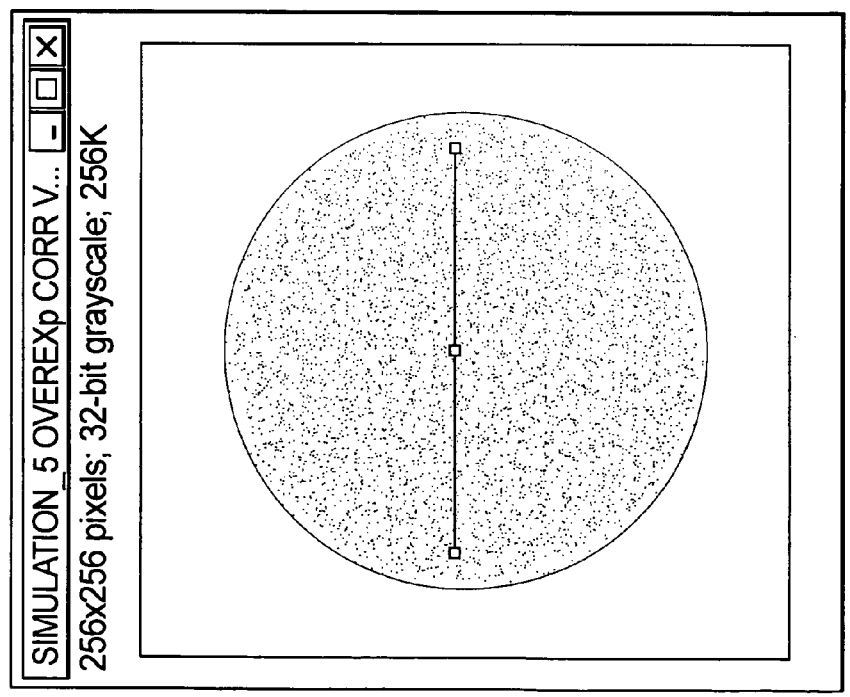
FIG. 6 shows the reconstructed image of the same object as in FIG. 5, with overexposure correction in accordance with the invention, together with the profile of the image line under consideration.

FIG. 5 shows a reconstructed slice of a homogeneous water-like cylinder with a diameter of 16 cm. The 2D projection images have been simulated in the way that the Artis system (commercially available from Siemens AG) would acquire the projection data. The 2D projection data were clipped toward the edges of the cylinder due to overexposure. In FIG. 5, no overexposure correction was undertaken. The HU values are too small, and exhibit the above-described capping artifact (−20 HU in the center of the object, instead of 0 HU, and toward the edges of the object the HU values decrease to −80 HU). FIG. 6 shows the same object, but with overexposure correction in accordance with the invention. The HU values are correct along the whole profile.

Figure 7:
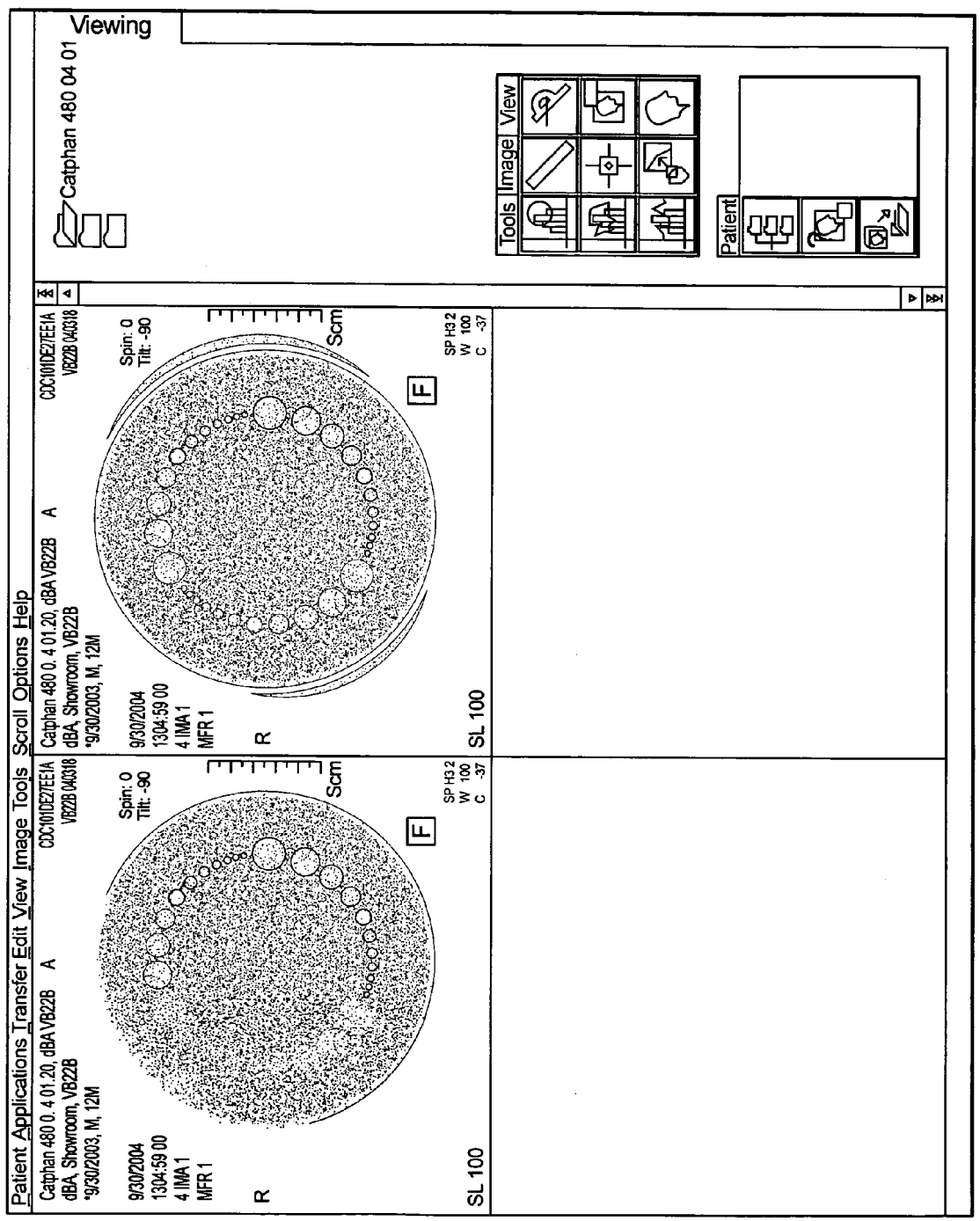
FIG. 7 illustrates the reconstructed slice of CATPHAN phantom, showing reconstruction at the left without overexposure correction and reconstruction at the right with overexposure correction in accordance with the inventive method.

FIG. 7 shows a reconstructed slice of a CATPHAN phantom (low contrast CTP 515 Module). The slice thickness was chosen as 10 mm. The 2D projection images exhibit clipping due to overexposure toward the edges of the object. The left image has been reconstructed without overexposure correction, wherein a clear and asymmetrical capping of the HU values toward the edges can be seen. The right image shows the same slice, but with overexposure correction according to the invention. The capping artifacts are much less pronounced.

The inventive method achieves effective and reliable correction of artifacts that occur due to detector overexposure, thereby improving the quality of 3D reconstructed images obtained with C-arm x-ray systems, especially in the case of low contrast resolution as occurs, for example, in computed tomography angiography, and for cone-beam tomography in general. The artifact projection proceeds dependent on the size of the object in the image. The computational load is relatively small, involving a simple extrapolation of 2D projection images prior to reconstruction.

Although modifications and changes may be suggested by those skilled in the art, it is the intention of the inventors to embody within the patent warranted hereon all changes and modifications as reasonably and properly come within the scope of their contribution to the art.

The invention claimed is:

1. A method for correcting image artifacts due to detector overexposure in computed tomography, comprising the steps of:

providing a plurality of computed tomography 2D projection images of an object to a processor at least some of said images in said plurality of images exhibiting clipping along a first direction due to overexposure of a radiation detector used to produce the 2D projection images, determining a maximum grayscale value in said processor as a function of an x-ray tube voltage, an x-ray tube current and a pulse width used to generate the 2D projection image;

in said processor, selecting an image line in each of said 2D projection images, said image line processing in a second direction perpendicular to said first direction, and determining whether clipping is present in that 2D projection image at either a first side of said image line or a second side of said image line;

for either side of said image line at which clipping is present, determining a along said first direction coordinate, referenced to said image line, at which the clipping ends;

for each of said sides in each of said 2D projection images in which clipping is present, extrapolating grayscale values in said processor between said coordinate at which clipping ends, and an edge of that 2D projection image closest to said coordinate at which clipping ends, according to an extrapolation formula dependent on said maximum intensity and a size of the object in that 2D projection image, to obtain a corrected 2D projection image wherein the clipping is substantially compensated; and reconstructing a 3D image of the object from the plurality of corrected 2D projection images, said 3D image being substantially free of capping artifacts resulting from said clipping due to said overexposure, and emitting data representing said 3D image as an output from said processor, in a form allowing display of said 3D image.

2. A method as claimed in claim 1 wherein, for a 2D projection image $\lambda$, represented as $g(x,y,\lambda)$, said coordinate at which clipping ends at the first side of said image line is $x_{0,l}$ and said coordinate at the second side of said image line at which clipping ends is $x_{0,r}$, and comprising extrapolating said grayscale values at said left side of said image line according to $$g(x, y, \lambda)=g_0(\lambda)-e^{-(x-x_{0,l})^2/\zeta_l^2}\cdot[A_l(x-x_{0,l})+B_l].$$

wherein $$B_l = g_0(\lambda) - g(x_{9,l}, y, \lambda),$$

$$A_l = -g'(x_{0,l}, y, \lambda).$$

wherein $g_0(\lambda)$ is said maximum intensity and $\zeta_l$ is related to said size of the object and indicates a rapidity with which $g_0(\lambda)$ is asymptotically reached at said left side, and extrapolating said grayscale values at said right side of said image line according to $$g(x, y, \lambda) = g_0(\lambda) - e^{-(x-x_{0,r})^2/\zeta_r^2} \cdot [A_r \cdot (x-x_{0,r}) + B_r].$$

wherein $$B_r = g_0(\lambda) - g(x_{0r,l}, y, \lambda),$$

$$A_r = -g'(X_{0,r}, y, \lambda).$$

wherein $$B_l = g_0(\lambda) - g(x_{9,l}, y, \lambda),$$

$$A_l = -g'(x_{0,l}, y, \lambda).$$

wherein $g_0(\lambda)$ is said maximum intensity and $\zeta_l$ is related to said size of the object and indicates a rapidity with which $g_0(\lambda)$ is asymptotically reached at said left side, and extrapolating said grayscale values at said right side of said image line according to $$g(x, y, \lambda) = g_0(\lambda) - e^{-(x-x_{0,r})^2/\zeta_r^2} \cdot [A_r \cdot (x-x_{0,r}) + B_r].$$

wherein $g_0(\lambda)$ is said maximum intensity and $\zeta_l$ is related to said size of the object and indicates a rapidity with which $g_0(\lambda)$ is asymptotically reached at said left side, and extrapolating said grayscale values at said right side of said image line according to $$g(x, y, \lambda) = g_0(\lambda) - e^{-(x-x_{0,r})^2/\zeta_r^2} \cdot [A_r \cdot (x-x_{0,r}) + B_r].$$

wherein $$B_r = g_0(\lambda) - g(x_{0r,l}, y, \lambda),$$

$$A_r = -g'(X_{0,r}, y, \lambda).$$

wherein $\zeta_r$ is a parameter related to said size of the object and indicating a rapidity with which $g_0(\lambda)$ is asymptotically reached at the second side of said image line.

3. A method as claimed in claim 2 comprising estimating $\zeta_l$ and $\zeta_r$ by orthogonal projections of the object.

4. A method as claimed in claim 1 comprising additionally analyzing each 2D projection image in said processor to determine whether clipping occurs in a center region of that 2D projection image and, if so, making a smooth extrapolation of the grayscale values in said center region to substantially compensate said clipping in said center region.

* * * * *